April 21, 1964     C W. MUSSER     3,129,845
TIMING DEVICE AND DISPENSER
Filed March 17, 1961
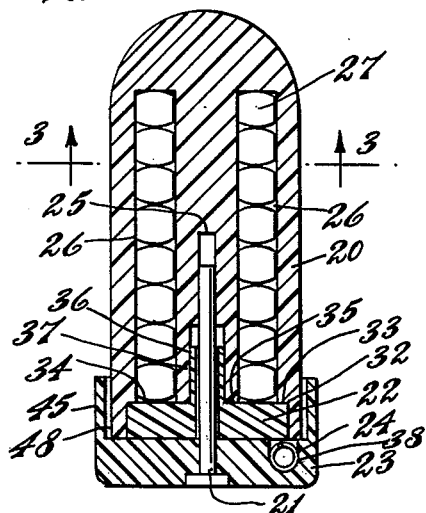
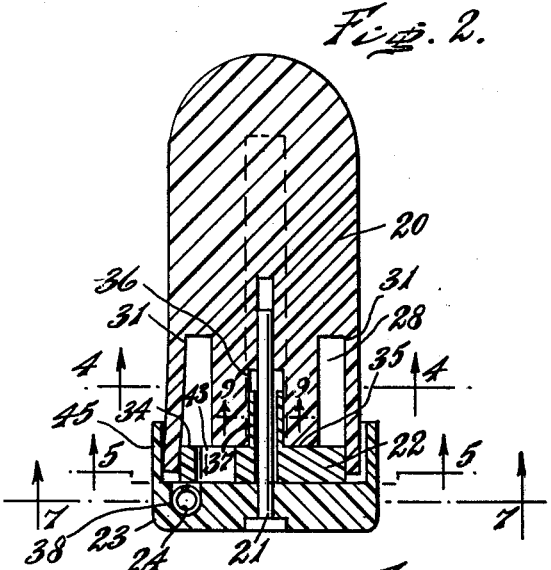
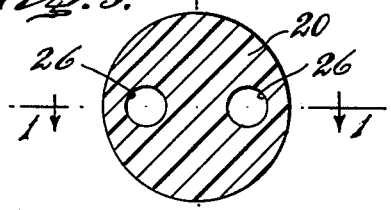
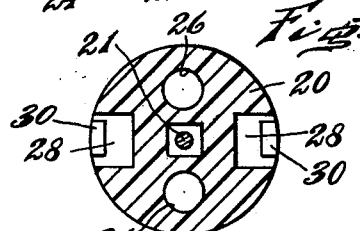
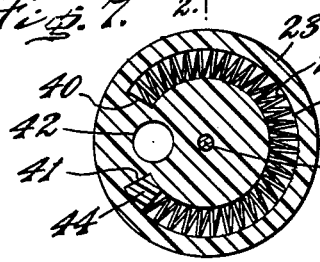
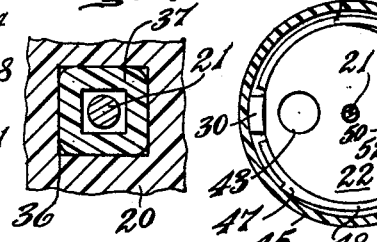
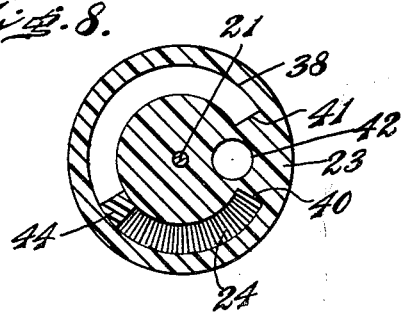
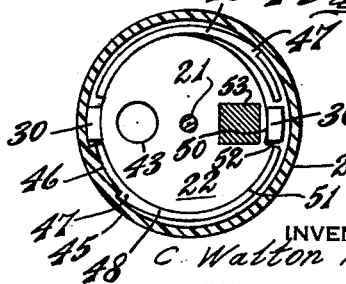
INVENTOR
C. Walton Musser
BY
ATTORNEYS

United States Patent Office 3,129,845
Patented Apr. 21, 1964

3,129,845
TIMING DEVICE AND DISPENSER
C Walton Musser, Beverly, Mass.
(928 Via Panorama, Palos Verdes Estates, Calif.)
Filed Mar. 17, 1961, Ser. No. 96,483
10 Claims. (Cl. 222—41)

The present invention relates to timing devices and to dispensers which operate under time control.

A purpose of the invention is to provide a simple and inexpensive timing device in which the timing is regulated by the cold-flow properties of a plastic material.

A further purpose is to protect against the possibility that a user may take medicine or the like at too close intervals or in too large quantities, by providing a very simple timing dispenser which will protect against the possibility that the medicine can be administered more often than required.

A further purpose is to provide a simple timer indicator which assures that a particular action such as the administration of medicine cannot occur more frequently than required.

A further purpose is to control the action of a timer by the cold-flow of a plastic tube in contact with a cylindrical cam. This acts as brake means.

A further purpose is to latch a dispenser against dispensing until a timer releases the latch so as to permit the dispenser to function.

Further purposes appear in the specification and in the claims.

In the drawings I have chosen to illustrate one only of the numerous embodiments in which the invention may appear, selecting the form shown from the standpoints of convenience in illustration, satisfactory operation and clear demonstration of the principles involved.

FIGURE 1 is an axial section of the device of the invention, the section being taken on the line 1—1 of FIGURE 3.

FIGURE 2 is an axial section of the device of FIGURE 1, the section being transverse to that of FIGURE 1 and taken on the line 2—2 of FIGURE 3.

FIGURE 3 is a transverse section on the line 3—3 of FIGURE 1.

FIGURE 4 is a transverse section on the line 4—4 of FIGURE 2.

FIGURE 5 is a transverse section on the line 5—5 of FIGURE 2, showing the parts before dispensing.

FIGURE 6 is a view corresponding to FIGURE 5, with the cap relatively rotated with respect to the position of FIGURE 5, showing the parts after dispensing.

FIGURE 7 is a section on the line 7—7 of FIGURE 2, showing the spring released, and the parts before dispensing.

FIGURE 8 is a view corresponding to FIGURE 7 showing the spring compressed, and the parts after dispensing.

FIGURE 9 is an enlarged fragmentary section through the timer cam taken on the line 9—9 of FIGURE 2.

Describing in illustration but not in limitation and referring to the drawings:

Frequently medicine is dispensed which should not be taken oftener than prescribed, say every two, three, four, etc., hours. This is particularly true of so-called "sleeping pills," pain relievers, sedatives, tranquilizers, hormones, antibiotics, etc., which if taken too frequently or in an overdose can be dangerous or even fatal. It is a rather common occurrence for a person (probably in the drousy state from the past dose) to take an overdose of sleeping pills which could cause death.

The device of the invention comprises a timer-indicator suitable for administration of medicines and a dispenser for packaging the same.

It is also designed so that only the proper number of pills (one at a time, two at a time, etc.) can be had in the given time period. It also contains an indicator to show whether or not a pill has been taken within this time period. This is beneficial to people whose habits or whose memory will not assure that they take the pill at the prescribed time. Even persons with a good memory frequently wonder whether they did or did not take the pill at the particular time, because the operation of taking a pill is so simple that it can become almost automatic.

With the present invention, a glance at the device will give the required information, and even if the patient should wish to disobey doctor's orders and take two or more pills instead of one as prescribed, he cannot do so.

In order to prevent taking more than one pill within a desired time period (or if two pills have been prescribed, in order to prevent taking more than the prescribed number) the invention uses a time delay mechanism for metering out the pills. After the dispenser has gone through its time cycle, it will pick up a pill or a prescribed number of pills and place it or them in such position that it or they can be dispensed by the user. When this happens, a new time period starts and the new time period must transpire before another pill or group of pills can be dispensed.

The time period for the particular dispenser is made to approximately match the prescribed time for taking the pills. For example, if the pills are prescribed to be taken every two hours, the dispenser may be made to permit dispensing a pill after one and three-quarters hours have elapsed. The device of the invention is not intended to provide a precise timing mechanism, but is intended to perform the following functions:

1. It will show whether a pill has been recently taken.
2. It will prevent pills from being taken so frequently that the medicine becomes hazardous.

The dispenser should match the pills which are placed therein. This will particularly be true where the dispenser is used to supply the pills from the drug manufacturer, or where the dispenser is filled by the druggist with the particular pills prescribed by the physician. In either case this provides a protective device to prevent anyone from inadvertently taking an overdose or a too-frequent dose.

In accordance with the invention, the dispenser body is provided with a cap which can be rotated a half revolution at the end of each prescribed medicine administering time period. At the completion of the half revolution, a pill or group of pills is dispensed through a dispensing opening in the cap. Rotation of this half revolution then locks the cap in place and it cannot be further rotated until the end of the prescribed time. At the end of the prescribed time period the hole through which the pill is dispensed will now show an indication that the device is ready to dispense. This indication may be a color such as green or it may be printed wording if desired. When this indication shows, the cap can now be rotated an additional half revolution and another pill dispensed.

In the broadest aspect of the invention various timing devices can be used, such as clock escapement means, kitchen timers, electrical timers such as are commonly used in electric toasters, or other suitable timers may be employed.

The device of the invention, however, will preferably be a device of much greater simplicity and lower cost than devices of this character. It is not necessary to have the accuracy of a clock escapement means. The device of the invention can be produced so inexpensively that it will be used only once and then thrown away.

The means used in the device of the invention to establish the time interval is the cold flow properties of a plastic such as polyethylene or polytetrafluorethylene. A compression spring is compressed which tends to rotate a timer element. To rotate, the timer element must constantly deform. The time required to rotate the timer element one-half revolution is dependent on:

(1) The force exerted by the spring.
(2) The thickness of the plastic parts.

These two parameters determine the pounds per square inch stress in the plastic part which in turn determines its cold flow rate. It is of course obvious that a change in material or a change in extent of polymerization of the plastic can be used to influence the time period.

The device of the invention consists of a dispenser body 20, a metallic fastening pin 21, a timing element 22, a cap 23 and a helical metallic compression spring 24. The pin 21 may be of any other desired form. The body 20, timing element 21 and cap 23 are suitably of plastic such as polyethylene or polytetrafluoroethylene as above mentioned. The body 20 is conveniently bullet shaped, having a central axial opening 25 which receives and makes a force fit with the pin 21, and having medicine storage reservoirs 26 (of which two are shown) extending parallel to and equally spaced from the axis, which contain suitable pills, capsules or other increments 27 of medicine to be dispensed. The pills may be cylindrical, spherical, bullet shaped or otherwise shaped. At positions displaced 90° from the medicine storage reservoirs 26, the body 20 has near the dispensing end openings 28 parallel with the axis and outside this are provided deflectable latches 30 which are free from the material of the dispenser body at the lower ends but connect to it near the upper ends at 31. The latches are deflectable and are shorter than the bottom of the body 20 so that they will not bind. At other parts of the circumference of the lower end, the body has a cylindrical recess 32 which is adapted to receive and freely journal the timer element 22. This recess 32 provides shoulders 33 which engage a disclike surface 34 on the timer element 22, the center portion of the lower end of the body at 35 being in the same plane and similarly engaging the disclike surface 34.

Concentric with the pin opening 25 at the lower end of the body 20 is an internal cylinder cam opening 36, having a cross section which is suitably square, which receives and deforms a timer tube 37 extending from the timer element 22 so that the timer tube 37 in its deformed form will be generally conforming to the cam surfaces (square) as shown in FIGURE 9. The timer tube 37 is concentric with the pin 21.

The cap 23 is rotatable on the pin 21 as is also the timer element 22. The cap has a circumferential spring-retaining recess 38 which follows a circular path but terminates short of a complete circumference to provide an end abutment 40 at one end and an end abutment 41 at the other end. Between these two abutments 40 and 41 is a dispensing opening 42 adapted to align in distance from the axis with the reservoirs 26 and also adapted to align in distance from the axis with dispensing opening 43 which is in the timer element 22.

The timer element 22 has a projection 44 into the spring recess 38 which engages the end of the spring 24 opposite to the end engaged by the abutment 40 and can compress the spring.

The cap 23 has a flange 45, best seen in FIGURES 5 and 6, which is circular but has at one circumferential position as shown an internal abutment 46 which is adapted to act as a pawl with respect to ratchet teeth 47 which are on the outside of the semi-cylindrical extending portions 48 of the dispenser body 20, extending into the space between the timer element 22 and the flange 45 of the cap.

The timer element 22 has a depressed portion 50 which is adapted to receive one of the latches 30 and then gradually bulges on a cam portion 51 which can force the latch outwardly, merging with the depressed portion by an abrupt portion 52.

The pills will normally be gravity fed so that they will tend to remain in the bottom of the reservoirs 26, although if desired there can be a spiral or other suitable compression spring in the reservoirs 26 above the pills to feed the pills toward the cap 23 as they are dispensed.

The timer element normally covers the bottoms of the reservoirs 26 except at the middle of the time period when it is in line with the hole at the bottom of one of the reservoirs. The thickness of the timer element is equal to the thickness of one pill (or if two pills are to be dispensed together, it will be of the thickness of two pills). Hence, when the hole 43 in the timer element 22 is in line with a reservoir 26 in the body, a pill can drop down into the hole 43 in the timer element.

The timer tube 37 which is forced into the square cam hole 36 in the center of the body 20 is deformed and is keyed to the body and prevented from rotation except as cold flow occurs when the stress of the compression spring 24 exceeds a predetermined value.

The tang 44 which protrudes into the circular slot 38 of the cap engages one end of the spring 24 so that when the cap is turned clockwise as viewed in FIGURES 7 and 8, from the position of FIGURE 7 before dispensing to the position of FIGURE 8 after dispensing, the spring is compressed to the position of FIGURE 8 and the timer element 22 is urged by the spring toward rotation. This creates the stress in the timer tube 37 which causes cold flow.

It will, of course, be evident that any desired form of surface can engage the timer tube. Thus, if the cam 36 is round, the timer tube will desirably have an adhesive of high viscosity such as a pressure sensitive tape adhesive, which will undergo the cold flow and provide the desired time delay. For short time intervals cold flow of an adhesive is preferable but for long time intervals, cold flow of the timer tube 37 is preferred as shown in FIGURE 9.

The opposite latches 30 on the body are normally flush with the outside of the body as at the right in FIGURES 5 and 6. The cam surface 51 on the timing element 22, however, deflects these latches 30 so that they protrude beyond the outside diameter of the body as at the left in FIGURES 5 and 6. There is however, the undercut section 50 just beyond the tooth 52 into which one of the latches can fit so as to release. Hence, when one of the latches is against this undercut part 50, the other latch is protruding as shown at the left in FIGURES 5 and 6. When the cap is turned clockwise therefore as in FIGURE 6, after dispensing, the projecting abutment 46 on the inside of the cap runs into this protruding latch 30 and prevents further rotation, as at the left of FIGURE 6.

A ratchet tooth 47 on the outside of the body prevents the cap 23 from turning counterclockwise as at the left in FIGURE 6.

The flexibility of the cap 23 and the body 20 permit the cap to be turned clockwise until the cap is stopped by the latch 30 which is protruding outwardly.

When the cap is rotated clockwise, it contains the compression spring 24 and compresses the spring. When the cap is stopped from being turned clockwise by the latch 30, and the turning motion is released, the cap tends to drop back counterclockwise until the ratchet tooth 47 grips it.

A hole 42 in the cap 23 aligns with the hole 43 in the timer element 22 when the cap is stopped in its forward position clockwise. This tends to dispense the pill after the timer has timed out since the timer element receives a pill in its dispensing opening 43 when it goes past the 90° point. Turning the cap 23 loads up the spring 24 and this slowly turns the timer element 22. After the timer element 22 rotates 180°, the cap 23 is unlocked because the latch 30 which is clockwise of the abutment 46 is in the depressed portion 50 of the timer element, so that it ceases to latch. A color or other indicator 53 on the timer element 22 shows through the hole 42 on the cap (a green color may be used). The cap can then be rotated another 180° to dispense the pill. This dispensing action starts the timer element 22 all over again.

In view of my invention and disclosure variations and modifications to meet individual whim or particular need will doubtless become evident to others skilled in the art, to obtain all or part of the benefits of my invention without copying the structure shown, and I therefore, claim all such insofar as they fall within the reasonable spirit and scope of my claims.

Having thus described my invention, what I claim as new and desire to secure by Letters Patent is:

1. In a device, a timing element, brake means including a plastic material which undergoes cold flow for retarding the movement of the brake means and the motion of said timing element, means for biasing said timing element to move and thereby causing cold flow to increase in the plastic material of said brake means, and means for indicating movement of said timing element to a position at which cold flow of said plastic material has taken place.

2. A device of claim 1, in which said brake means includes cam means and plastic material subject to cold flow which is urged toward displacement by said cam means.

3. A device of claim 1, in which said brake means comprises cylindrical cam means and a tube of plastic material subject to cold flow engaging and subject to deflection by said cylindrical cam means.

4. A device of claim 1, in which said timing element is a rotor and said brake means is concentric with said rotor and includes cam means and plastic material subject to cold flow connected to said rotor and caused to deflect by said cam means.

5. A device of claim 1, in which said means for biasing comprises a spring urging said timing element in the direction which will bias said plastic material to undergo cold flow.

6. A device of claim 1, in which said brake means comprises latch means responsive to the position of said timing element, and released by rotation of said timing element as permitted by cold flow of said plastic material.

7. In a timer controlled dispenser, a container body having a receptacle adapted to receive a pill to be dispensed, a dispenser feeder mounted on said body and having a dispensing opening adapted to dispense material from said receptacle, a timer element interposed between said body and said dispenser feeder and having a dispensing opening adapted to receive said pill to be dispensed and discharge the same into the dispensing opening of the dispenser feeder, said timer element being adapted to move from a non-dispensing to a dispensing position, brake means involving a material undergoing plastic flow for retarding the motion of said timer element from the dispensing to the non-dispensing position, and means for biasing the timer element and the brake element to cause cold flow of said plastic material and urge the timer element toward dispensing position.

8. A dispenser of claim 7, in which the timer element and the dispenser feeder are rotatable, in combination with means interposed between the timer element and the dispenser feeder for latching the dispenser feeder against movement to dispensing position, said latching means being released by rotation of said timer element after cold flow takes place in said plastic material.

9. A dispenser of claim 8, in which said biasing means comprises spring means mounted circumferentially in said dispenser feeder and acting against said timer element.

10. A device of claim 9, in combination with ratchet means acting between said dispenser feeder and said body to prevent counter-rotation of said dispenser feeder.

References Cited in the file of this patent

UNITED STATES PATENTS

| | | |
|---|---|---|
| 1,916,974 | Fuller et al. | July 4, 1933 |
| 2,714,927 | Stern et al. | Aug. 9, 1955 |
| 2,812,851 | Kinnebrew | Nov. 12, 1957 |